Feb. 21, 1950           C. A. FINE           2,498,407
MEANS OF METERING AND DELIVERING
LUBRICANTS AND THE LIKE
Filed Oct. 30, 1943
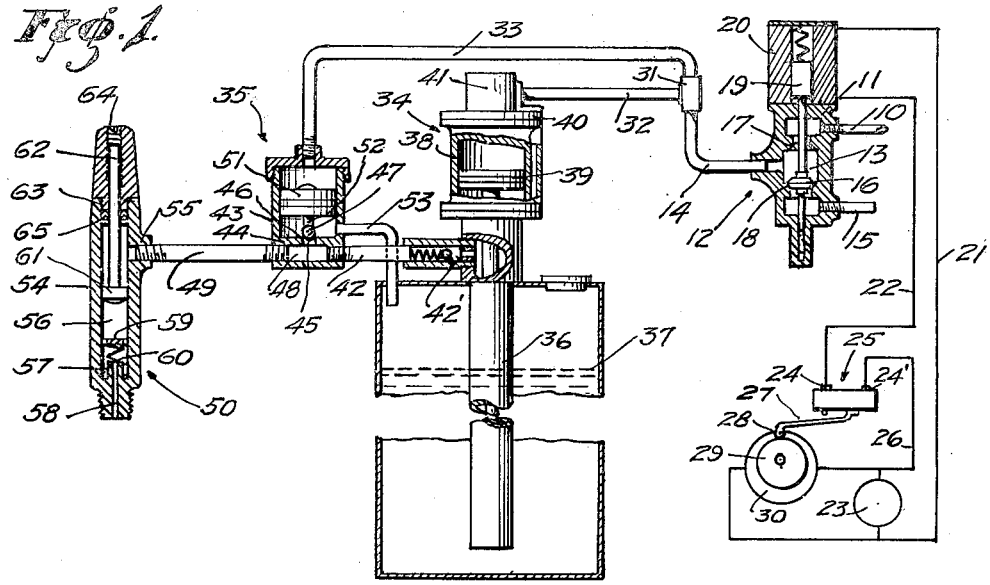
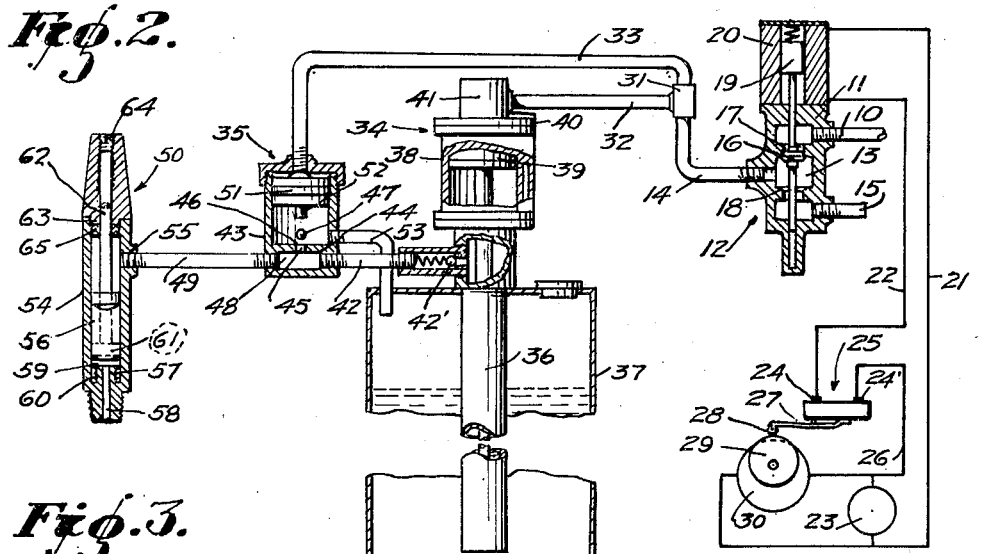
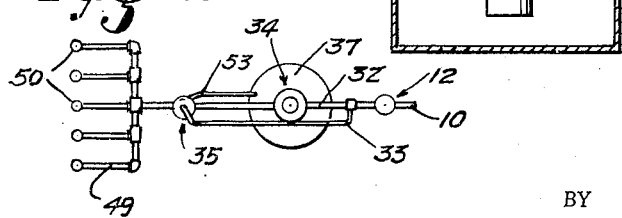
INVENTOR.
CHARLES A. FINE.
BY James M. Abbott
ATTY.

Patented Feb. 21, 1950

2,498,407

UNITED STATES PATENT OFFICE 2,498,407

MEANS OF METERING AND DELIVERING LUBRICANTS AND THE LIKE

Charles A. Fine, Los Angeles, Calif.

Application October 30, 1943, Serial No. 508,451

1 Claim. (Cl. 184—7)

This invention relates to lubricating equipment, and particularly pertains to a means of metering and delivering lubricants and the like.

In the operation of power plants, machine tools, and like equipment, it is desirable to provide predetermined quantities of liquids and semi-solids, such as lubricating oil, cutting compound, or grease, to a piece of apparatus at consecutive intervals. For example, it may be desirable to apply a lubricating grease under pressure to one or more points to be lubricated, or to provide measured quantities of a cutting compound to the cutter and work in a machine tool, the lubricant or compound being discharged from the device under a predetermined selected pressure. Heretofore, equipment has been provided by which measured quantities of lubricating oil, grease, or other liquid or semi-solid products have been delivered to one or more points of use at definite intervals of time, and if desired over a selected period of time. These structures have been for the most part complicated and expensive and liable to get out of order. Furthermore, these structures function in a manner to maintain portions of the apparatus and the fluid delivery conduits under constant motive fluid pressure even during the periods between discharge intervals of the operating cycle. This condition is particularly undesirable when the point of discharge from the apparatus is disposed remotely from the pumping unit, since the fluid delivery conduits will be maintained under an objectionably high fluid pressure. It is the principal object of the present invention, therefore, to provide a simple method and inexpensive means of automatically delivering predetermined quantities of a liquid or semi-solid material to one or more points of application at a predetermined pressure in a selected periodic time sequence and if desired over a predetermined period of a time cycle while insuring that the motive fluid pressure will not be imposed upon the fluid delivery lines during the idle period of the cycle, and which apparatus is simple in construction and will operate continuously and with certainty.

It is a further object of the present invention to provide means whereby fluid under pressure may be delivered to a plurality of discharge points from a centralized storage and pumping station in a manner to insure that the pressure fluid supply conduits and the discharge conduits will be relieved of pressure during the periods between pumping and discharge of the fluid.

The present invention contemplates the provision of a pneumatic pump for discharging a liquid or semi-solid material from a container and in conjunction with which pump valve means are provided to measure desired quantities of material discharged from the container and imposing a selected pressure thereupon, whereby it may be discharged at intervals in an established time cycle.

The invention is illustrated by way of example in the accompanying drawings in which:

Figure 1 is a view in diagram showing the apparatus with which the present invention is concerned and indicating the position of the valves and control mechanism as fluid material is being delivered to the discharge valve.

Fig. 2 is a view similar to Fig. 1 showing the relation of the parts after discharge of the material has taken place and during the interval between discharge periods, with the intermediate position of the metering valve piston in dotted lines.

Fig. 3 is a diagrammatical view indicating apparatus for practicing the invention with a plurality of discharge outlets.

Referring more particularly to the drawings, 10 indicates an air induction pipe through which motive fluid is delivered under pressure, here shown as communicating with a housing 11 of a solenoid controlled valve structure 12. This housing has a passageway 13 therethrough communicating with an air eduction pipe 14. The housing 11 also is fitted with a bleeder pipe 15 which is in communication with the passageway 13. A valve member 16 is mounted within the passageway 13 and may move alternately to seat upon opposed valve seats 17 and 18. Thus, when the valve is seated against the seat 18 fluid may flow from the pipe 10 through the passageway 13 to the pipe 14, and when the valve element 16 is seated against the valve seat 17 a reverse flow of fluid may take place from the pipe 14 through the passageway 13 to the bleeder pipe 15. The valve 16 is equipped with a stem 19 which may be attached to or form a part of a core of a solenoid 20. The solenoid 20 is provided with electric conductors 21 and 22. The conductor 21 leads to a source of electric energy 23. The conductor 22 is connected to a pole 24 of a contact switch 25. The opposite pole of the switch is secured to a conductor 26 which leads to the other side of the source of electric energy 23. A wiper arm 27 is formed as a part of the switch and at its free end carries a roller 28 which rests against a timing cam 29 driven by a synchronous motor 30. The cam 29 may have any desired configuration to maintain the contact switch 25 closed for a predetermined interval of time and to permit the switch to be opened for a predetermined interval of time. This will determine the period during which the solenoid 20 is energized and the period during which air under pressure designated as motive fluid may pass through the valve structure 12 or bleed therefrom. The air eduction pipe 14 is preferably provided with a T-fitting 31 so that pipes 32 and 33 may be connected thereto. The pipe 32 delivers air to a pneumatically operated pump 34, while the pipe 33 delivers air to an unbalanced relief valve biased to close by motive fluid pressure and which relief valve is here generally indicated at 35.

The pump structure 34 may be of any desired commercial type, although it is here indicated as having a tubular pump column 36 which extends down into a tank or drum 37 within which a quantity of the liquid or semi-solid to be handled is placed. The column 36 extends upwardly through the head of the tank 37 and carries a pump cylinder 38 within which a piston 39 reciprocates. The upper end of the cylinder 38 is closed by a head 40 which carries a control valve 41 having a housing to which the air pipe 32 is connected. The details of construction of this valve are not a part of the present invention. Suffice it to say that the inflowing air under pressure is delivered alternately to opposite sides of the piston to reciprocate the same. This provides a reciprocating air motor. The column 36 may form a housing for the working barrels and pistons of a multi-stage fluid pump. The pistons are reciprocated by the piston 39 of the air motor, and in view of the relatively large pressure area of the piston 39 with relation to the area of the multi-stage pump pistons an exceedingly high pressure ratio is established and that the fluid discharge from the column 36 will have a maximum pressure as established by the aforesaid pressure differential. In fact, a pump structure as generally indicated at 34 may have an air to liquid ratio of forty to one. The liquid drawn from the container 37 is discharged through a pipe 42. The pipe 42 connects with the relief valve 35. The relief valve is used commonly in connection with high pressure fluid conduits to relieve pressure in a line when a motivating fluid pressure is interrupted. A structure of this type includes an outer housing 43 having an intermediate wall therein indicated at 44 through which a relatively small passageway 45 is formed. The upper end of this passageway provides a valve seat 46 upon which a valve ball 47 may rest. The portion of the housing 43 below the wall 44 is formed with a transverse passageway 48 with which the opening 45 communicates. This passageway is also in communication with the pump discharge pipe 42. A pipe 49 also connects with the passageway 48 so that the liquid or semi-solid discharged from the pump may be forced through the pipe 42, the passageway 48, and the pipe 49. The pipe 49 communicates with a metering valve 50 from which the liquid or semi-solid is finally discharged in a predetermined quantity and under a predetermined pressure. The housing 43 of the relief valve 35 is cylindrical above the partition 44 and receives a plunger 51 which is free to reciprocate within the cylindrical portion of the housing. This plunger carries a pin 52 on its lower face adapted to engage the valve ball 47 and to hold the ball onto its seat. The top of the housing 43 is closed save for a connection for the air pipe 33. Attention is directed to the fact that the area of the valve ball 47 exposed to the liquid pressure through the opening 45 is many times less than the area of the plunger 51 which is exposed to the motive air under pressure delivered through the pipe 33. By this arrangement the liquid from the pump 34 may be forced directly to the metering valve as pressure of air in pipe 33 is imposed upon the plunger 51 to hold the valve ball 47 on its seat, and to permit the pressure of the liquid passing to the metering valve to lift the valve 47 when the air pressure is relieved in pipe 33. It will be obvious therefore that when motive fluid is delivered to the relief valve 35 the valve will be biased and closed. The cylinder of the housing 43 is fitted with a return pipe 53 which extends into the container 37 and will return the liquid which passes through the opening 45 and beneath the valve ball 47.

The metering valve is generally indicated as including an outer cylindrical housing 54 which has a threaded opening 55 in its side wall to receive the end of the pipe 49. The housing forms a barrel having a cylindrical bore 56 with the upper end of which opening 55 communicates. The lower end of the housing is fitted with a central tubular valve seat 57 having a discharge opening 58 therethrough. Mounted within the bore 56 above the valve seat 57 is a valve disc 59 which has scalloped edges to permit fluid to pass around the disc and an imperforate center portion adapted to abut against and fit over the end of the tubular valve seat 57. A spring 60 tends to hold the valve disc 59 from its seat. Reciprocating within the bore 56 is a piston 61 having a rod 62 extending upwardly therefrom. This piston fits the bore 56 with a loose fit so that liquid under pressure may bypass the piston. Attention is also directed to the fact that the face of the piston contiguous to the rod 62 forms a square shoulder against which the pressure of the liquid delivered to the valve housing may impose force. Mounted in the upper end of the valve barrel 54 is a threaded plug 63 having a central passageway therethrough to receive the piston rod 62. The upper end of the passageway is threaded and carries an adjusting screw 64 by which the stroke of the piston is regulated, and thus the volume of liquid within the valve barrel 54 may be measured. Suitable packing 65 is mounted within the upper end of the valve barrel and around the piston. It is to be understood that while one valve 50 is shown, that the pipe 44 might be connected to a manifold to which a plurality of metering valves 50 are attached, so that measured quantities of liquid from a tank 37 might be discharged simultaneously through a plurality of said valves at different points, as required. Attention is directed particularly to the function and importance of the metering valve 50 in the operation of the present apparatus. Contrary to the operation of devices in which a direct discharge of fluid from pipe 49 is effected by pressure imposed through operation of pump 34, in this device a quantity of fluid is discharged from the metering valve 50 and a new charge is forced into the metering valve immediately following the discharge and before the delivery of motive fluid is interrupted by valve structure 12. The timing structure, including switch 25 and timing cam 29, have an appreciable time lag after the discharge of the metering valve to permit the metering valve sequence and to cause a necessary pressure to be built up in the pipe 49 and the passageway 48 so that when motive pressure is relieved from the piston 51 of the relief valve 35 the valve will open. This insures that the metering valve will be discharged and refilled and that surplus liquid will be vented thereafter through the pipe 53 and back into the container 37. Attention is directed to the fact that all of the conduits are of sufficient strength to withstand the fluid pressure imposed by the pump 34 and as limited by the established ratio between the piston 39 and the piston within column 36.

In operation of the present invention the container 37 is supplied with a quantity of a liquid or semi-solid material to be handled by the present apparatus. Air under pressure is delivered through the air induction pipe 10. At this time the synchronous motor 30 is supplied with electric current to cause it to drive continuously. A timing cam 29 has been selected for this motor, the cam being designed to maintain the electric circuit to the solenoid 20 closed for a desired period of time as previously explained. It will be obvious that the cam 29 may be given a desired configuration so that the valve 16 will rest against the valve seat 17 to interrupt the flow of air to the pipe 14 when the solenoid is energized or the valve 16 may be moved to its opposite seated position on the seat 18 to be thus held when the solenoid is de-energized. In either event it will be understood that a suitable spring is associated with the solenoid 20 and the valve to move the valve 16 to an alternate position when the solenoid is de-energized. It is also to be understood that the valve structure 12 may be of any particular design, and that the construction shown in the drawing is merely diagrammatical and for the purpose of illustration only. Assuming that the valve 16 is normally held upon the seat 18 when the solenoid is de-energized, it will be seen that the air under pressure from the pipe 10 will pass through the valve housing 11 and into the eduction pipe 14. The air will then flow through the pipe 32 to the pump structure 34 and through pipe 33 to the relief valve 35. As the air is forced downwardly into the cylinder 38 of the air motor the piston 39 will be forced downwardly and will act to energize the pump structure included within the barrel 36. Delivery of air to the opposite side of the air motor piston 39 will lift the piston within its cylinder. As the pump functions the liquid from the container 37 will be forced outwardly through the conduit 42 and into the passageway 48 of the relief valve 35. A check valve 42' in the conduit 42 prevents a return flow of the material to the pump. As the liquid is delivered from the pump structure 36 through the pipes 42 and 49 the pressure of this liquid will be imposed upon the exposed surface of the valve ball 47 in the relief valve, as represented by the sectional area of the passageway 45. Simultaneously, air under pressure is applied to the plunger 51 through the air pipe 33 to hold the valve ball 47 on its seat. Fluid material which is forced through the pipe 49 to the metering valve 50 will enter the bore 56 of the valve housing 54 through the passageway 55 and will impose its pressure upon the upper face of the piston 61. This will force the piston 61 from the position shown in Fig. 1 of the drawing to the position shown in dotted lines in Fig. 2. By reference to Fig. 1, it will be seen that as the piston 61 is forced downwardly a measured quantity of the fluid material within the bore 56 will be forced around the edge of the washer 59 and will be discharged from the valve housing 54 through the duct 58. As the valve piston 61 continues to move downwardly it will encounter the washer 59 and compress the spring 60 until the piston has forced the valve disc 59 against the end of the tubular valve seat 57 to seal the duct 58 and to prevent the discharge of fluid material from the metering valve while a new charge is entering the valve and is being measured. As the pump continues to operate the fluid material from the pump will be forced through the pipe 49 and into the bore 56 of the metering valve. In view of the fact that the piston 61 fits the bore 56 with a loose fit the incoming fluid material will be forced down and around the piston 61, and since the end face of the piston 61 is convex this fluid will force between the end face of the piston 61 and the valve disc 59. The fluid pressure will thus maintain the valve disc on its seat while exerting an end pressure upon the piston 61 and its rod 62 to lift the piston as the space between the end of the piston and the valve disc fills with the fluid material, which is under high pressure. When the piston 61 has been moved upwardly to the point where the piston rod 62 encounters the adjusting screw 64 a predetermined measured quantity of fluid material will fill the space between the seated valve disc 59 and the end of the piston. The valve disc 59 will remain in this seated position until the cam 29 acts upon the contact switch wiper 27 to complete an electric circuit from the source 23 through conductors 21 and 22 to the solenoid 20. This will energize the solenoid, moving the valve element 16 from the seat 18 to the seat 17. It will be recognized that prior to the opening of the valve continued pumping action will build up any desired pressure of the fluid material in the metering valve 50, since this material holds the valve disc 59 on its seat. When the supply of air from the pipe 10 is interrupted by the energization of the solenoid the delivery of air under pressure to the pump 34 and the relief valve 35 through pipes 32 and 33 will also be interrupted, and these pipes will be connected with the bleeder pipe 15. In view of the fact that a desired pressure has been built up upon the fluid material passing from the pump 34 and filling conduits 42 and 49 and the passageway 48 in the relief valve 35 the relief of air pressure upon the plunger 51 will permit the pressure of the fluid material in passageway 48 to act effectively through the valve seat opening 45 to lift the valve ball 47, with the result that the pressure existing in pipes 42 and 49 will be relieved, while an incidental amount of the fluid material will pass through the valve opening 45 and into the return pipe 53 leading to the container 37. It is to be understood that prior to the energization of the solenoid 20 a considerable fluid pressure has been built up in the metering valve 50. This is due to the great power ratio established in the pump 34. In fact, fluid pressures of the order of four thousand pounds per square inch may be created in the metering valve 50 if desired. When the relief valve 35 is relieved of its air pressure through the bleeder pipe 15 and the valve ball 47 lifts from its seat the fluid pressure in the conduits 42 and 49 will be instantly relieved. This will allow the valve spring 60 in the metering valve 50 to lift the valve disc 59 from its seat and open the discharge duct 58. Thereafter a new cycle of operation takes place by breaking the electric circuit to the solenoid through the contact switch 25 and permitting the valve 16 to move from the seat 17 to the seat 18 so that the bleeder pipe 15 will be closed and flow of air under pressure from the pipe 10 to the pipe 14 will be re-established.

It will thus be seen that by the structure here disclosed it is possible to draw any fluid material from a container and discharge it in measured quantities and in a predetermined time sequence to a point of application near the pumping equipment or remote therefrom, and that the method and apparatus insure certainty of automatic operation and permit any desired change to be made in quantity of fluid delivered or time sequence.

It will be noted also that due to the fact that the discharged fluid is measured and its pressure established at the point of discharge, and for the further reason that delivery of pressure fluid to the pump is interrupted and the fluid pressure in the discharge lines is relieved between discharge periods in the operating cycle, the apparatus will be subjected to high pressure strain until it is relieved.

It is to be understood that while the cut-off valve structure, the pump, the relief valve, and the metering valve are shown as being of particular design, this is merely by way of example and any type of element having the required function may be substituted for those here shown and described. Furthermore, while the fluid pressure cut-off valve is indicated as being closed to interrupt the flow of pressure fluid to the apparatus the operation may be reversed to establish a flow of pressure fluid through the valve by energization of the solenoid.

While I have disclosed the preferred steps of the method for practising my invention and the preferred apparatus to be used, it is to be understood that various changes in the steps of procedure as well as changes in the combination, construction and arrangement of parts of the apparatus might be made by those skilled in the art, without departing from the spirit of the invention as claimed.

Having thus described my inventon, what I claim and desire to secure by Letters Patent is:

A device for delivering measured quantities of a fluid from a supply source to a given point at recurrent intervals, which device includes a storage tank for said fluid, an air pressure operated pump for discharging fluid from said tank, a fluid discharge conduit connected at one end to said pump, a metering valve connected to the opposite end of said fluid discharge conduit, said metering valve being characterized as operating under fluid discharge pressure to discharge a measured quantity of fluid from the valve and to refill the valve, a relief valve structure disposed at a point in the length of the fluid discharge conduit, a check valve interposed in the fluid discharge conduit between the pump and the relief valve and opened under pump pressure, a vent conduit leading from the relief valve structure to the storage tank, a relief valve element normally to prevent communication between the fluid discharge conduit and the vent conduit, a motive air supply conduit for connection with a source of air under pressure, a solenoid operated valve connected to said air supply conduit, two air feed conduits connected in parallel to said solenoid valve, one of said air feed conduits connected to deliver air to the pressure operated pump and the other air feed conduit connected to deliver air to the pressure operated pump and the other air feed conduit connected to deliver air to the relief valve tending to close the same, a bleeder conduit for bleeding air from the solenoid actuated valve structure, valve means forming a part of said solenoid actuated valve structure and movable to alternate positions for establishing communication between the supply conduit and the feed conduits or between the bleeder conduit and the feed conduits, an electric circuit including the solenoid valve and a source of electric supply, and an intermittently operated synchronous switch, means for periodically actuating said switch to move and hold the solenoid valve in one position for a predetermined period of time to connect the supply conduit to the feed conduits to thereby energize the fluid operated pump and close the relief valve, said period of time being sufficient to actuate the pump to force into said fluid discharge conduit the quantity of fluid required to discharge the metering valve, refill the metering valve and create sufficient pressure in said discharge conduit for opening the relief valve after said period upon the opening of said switch and movement of the solenoid valve means to its other or bleeding position.

CHAS. A. FINE.

REFERENCES CITED

The following references are of record in the file of this patent:

UNITED STATES PATENTS

| Number | Name | Date |
| --- | --- | --- |
| 1,739,787 | Doughty | Dec. 17, 1929 |
| 1,896,036 | Bell | Jan. 31, 1933 |
| 1,953,222 | Gordon | Apr. 3, 1934 |
| 2,141,022 | Rotter | Dec. 20, 1938 |
| 2,205,320 | Teal | June 18, 1940 |
| 2,206,335 | Rotter | July 2, 1940 |
| 2,328,812 | Klein | Sept. 7, 1943 |
| 2,339,532 | Venable | Jan. 18, 1944 |